United States Patent

Bühler et al.

[11] Patent Number: 4,851,012
[45] Date of Patent: Jul. 25, 1989

[54] MIXTURES OF BLUE DISPERSE MONOAZO DYESTUFFS

[75] Inventors: Ulrich Bühler, Alzenau; Hubert Kruse, Kelkheim; Reinhard Kühn, Frankfurt am Main; Margareta Boos, Hattersheim, all of Fed. Rep. of Germany

[73] Assignee: Cassella Aktiengesellschaft, Frankfurt am Main, Fed. Rep. of Germany

[21] Appl. No.: 151,010

[22] Filed: Feb. 1, 1988

[30] Foreign Application Priority Data

Feb. 16, 1987 [DE] Fed. Rep. of Germany ....... 3704809

[51] Int. Cl.$^4$ ............ C09B 29/08; C09B 67/22; D06P 1/18
[52] U.S. Cl. ................................. 8/639; 8/662; 8/921; 8/922; 8/924
[58] Field of Search ............................ 8/639

[56] References Cited

U.S. PATENT DOCUMENTS

| | | | |
|---|---|---|---|
| 3,954,395 | 5/1976 | Leverenz | 8/639 |
| 4,237,048 | 12/1980 | Gottschlich et al. | 534/850 |
| 4,321,055 | 3/1982 | Hansen et al. | 8/639 |
| 4,329,148 | 5/1982 | Hansen et al. | 8/639 |
| 4,381,262 | 4/1983 | Buhler et al. | 534/850 |
| 4,405,330 | 9/1983 | Bergmann et al. | 8/639 |
| 4,687,476 | 7/1987 | Tappe et al. | 8/639 |

FOREIGN PATENT DOCUMENTS 57-139578 8/1982 Japan.

Primary Examiner—A. Lionel Clingman
Attorney, Agent, or Firm—Connolly and Hutz

[57] ABSTRACT

A mixture of monoazo dyestuffs which contains one or more dyestuffs of the formula I

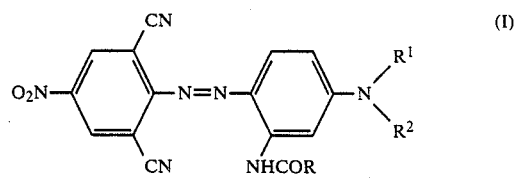

and one or more dyestuffs of the formula II

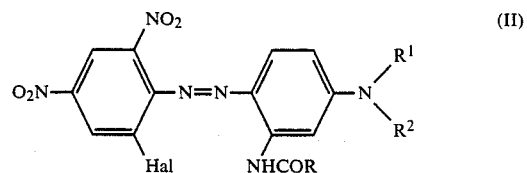

wherein $R^1$ and $R^2$ independently of one another each denote linear or branched alkyl with 1 to 6 carbon atoms, R denotes linear or branched alkyl with 1 to 5 carbon atoms and Hal denotes chloro or bromo, are outstandingly suitable for dyeing and printing hydrophobic materials.

10 Claims, No Drawings

MIXTURES OF BLUE DISPERSE MONOAZO DYESTUFFS

The invention relates to mixtures of monoazo dyestuffs, which are characterized in that they consist of one or more dyestuffs of the formula I

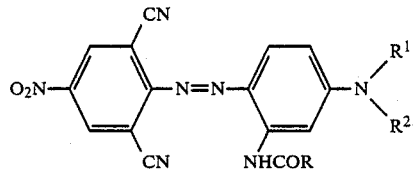

and one or more dyestuffs of the formula II

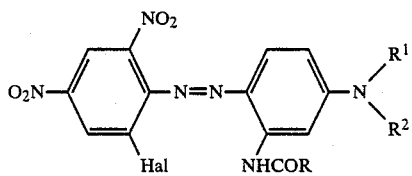

wherein $R^1$ and $R^2$ independently of one another denote linear or branched alkyl with 1 to 6 C atoms, R denotes linear or branched alkyl with 1 to 5 C atoms and Hal denotes chlorine or bromine.

The invention also relates to processes for the preparation of the dyestuff mixtures according to the invention and to their use for dyeing and printing hydrophobic fibre materials.

It is already known that mixtures of at least two different individual dyestuffs of the formula I have improved dyeing properties in comparison with the individual dyestuffs (compare German Auslegeschrift 2,234,465 (corresp. to U.S. Pat. No. 3,954,395), European Patent 93,935 and German Offenlegungsschrift 3,347,572 (corresp. to U.S. Pat. No. 4,689,050).

It has now been found, surprisingly, that the mixtures according to the invention have considerably improved dyeing properties in comparison with the individual dyestuffs.

Preferred dyestuff mixtures are those which consist of dyestuffs of the formulae I and II wherein $R^1$ and $R^2$ denote linear alkyl with 2 to 4 C atoms or R denotes linear or branched alkyl with 1 to 3 C atoms, and particularly preferred dyestuff mixtures are those in which $R^1$ and $R^2$ denote linear alkyl with 2 to 4 C atoms and at the same time R denotes linear or branched alkyl with 1 to 3 C atoms.

Preferred dyestuff mixtures are also those in which the radicals $R^1$ and $R^2$ in the individual components of the formulae I and II are in each case identical and preferably denote ethyl or n-propyl. Other preferred dyestuff mixtures are those in which at least 1 individual component of the formula I and at least 1 individual component of the formula II in which the radicals $R^1$ and $R^2$ are in each case identical differ from one another in these radicals. A preferred combination here is ethyl/n-propyl.

Particularly preferred dyestuff mixtures are those in which at least 1 individual component of the formula I and at least 1 individual component of the formula II differ in the radical R. Preferred combinations of R here are methyl/i-propyl and ethyl/i-propyl, particularly preferred combinations are ethyl/ n-propyl and i-propyl/n-propyl, and an especially preferred combination is methyl/n-propyl. Especially preferred dyestuff mixtures are also those mentioned as particularly or especially preferred and in which moreover the radicals $R^1$ and $R^2$ of the individual components are identical to one another and are ethyl or n-propyl.

The ratio of the different dyestuffs of the general formulae I and II in the dyestuff mixtures according to the invention can vary within relatively wide limits. The minimum weight content of one component is in general 1%, and the maximum weight content is 99%. A minimum weight content of 5% and a maximum weight content of 95% is preferred, and a minimum weight content of 25% and a maximum weight content of 75% is particularly preferred.

The individual dyestuffs used in the dyestuff mixtures according to the invention are already known and are described, for example, in German Patent 1,794,402 (corresp. to U.S. Pat. No. 4,237,048), European Patent 36,512 (corresp. to U.S. Pat. No. 4,381,262) and French Patent 810,412.

The dyestuff mixtures according to the invention can be prepared (a) by mixing the separately prepared and finished individual components and, preferably, (b) by finishing the individual components together.

The separately finished liquid or pulverulent individual components can be mixed in suitable mixers or stirrers. However, "wet mixing", in which the individual components are stirred into the dye liquor, is also possible.

Finishing of the individual components together is carried out such that the individual components are ground together in the presence of one or more dispersing agents or one or more emulsifiers in suitable mills, such as, for example, bead or sand mills.

If a pulverulent dispersion is to be prepared, spray drying must also follow the grinding operation. The grinding process is carried out at 0° to 100° C., advantageously at about 20° to about 70° C. In many cases, it may be advantageous to precede the grinding process by a stabilizing step in which the individual components are heated together at temperatures of 50° to 150° C. in water in the presence of one or more dispersing agents or emulsifiers, in which case heating to temperatures above 100° C. must be carried out in closed vessels. After addition of the dispersing agents or emulsifiers additionally required for grinding, the dyestuff mixture thus treated can then be ground immediately.

Instead of the dispersing agents or emulsifiers, a water-soluble organic solvent, such as, for example, ethanol, acetone or dimethylsulphoxide, but preferably an organic solvent of low water-solubility, such as, for example, n-butanol, toluene or chlorobenzene, can also be used in this stabilizing step. In the case of organic solvents of low water-solubility, a content of 1 to 10% of solvent in the liquid phase is sometimes already sufficient. In the case of the water-soluble organic solvents, the content should advantageously be between 5 and 50%. The stabilization times required are between ½ hour and about 3 hours. These organic solvents must be separated off by distillation or steam distillation before the grinding operation. Stabilization by dissolving the individual components in an organic solvent and crystallizing them or precipitating them, for example with water, together is also possible. Here also, the dyestuff mixture formed, in this case advantageously by filtration and subsequent washing with water, must be freed from the organic solvent.

Suitable dispersing agents for the grinding operation or stabilizing step described above are, for example, anionic or nonionic dispersing agents, which can also be used together. Anionic dispersing agents are, for example, condensation products of aromatic sulphonic acids and formaldehyde, in particular condensation products of alkylnaphthalenesulphonic acids and formaldehyde, condensation products of optionally substituted phenol with formaldehyde and sodium bisulphite, alkali metal salts of condensation products of optionally substituted phenol, naphthalene- or naphtholsulphonic acids, formaldehyde and sodium bisulphite, alkali metal salts of condensation products of optionally substituted phenolsulphonic acids, formaldehyde and urea, and alkali metal salts of ligninsulphonic acids, alkyl- or alkyl-arylsulphonates and alkyl-aryl-polyglycol ether-sulphates. Non-ionic dispersing agents or emulsifiers are, for example, reaction products of alkylene oxides, such as, for example, ethylene oxide or propylene oxide, with compounds which can be alkylated, such as, for example, fatty alcohols, fatty amines, fatty acids, phenols, alkylphenols, arylalkylphenols, arylalkylarylphenols and carboxylic acid amides, such as, for example, addition products of 5 to 10 ethylene oxide units onto $C_8$–$C_{10}$-alkylphenols.

The dyestuff mixtures are in general formulated to a dyestuff content of up to 50 per cent by weight and a dispersing agent content of up to 10%. For economic reasons, the dyestuff contents usually do not fall below 15 per cent by weight.

The dyestuff mixtures according to the invention can also contain other auxiliaries, for example those which act as oxidizing agents, such as, for example, sodium m-nitrobenzenesulphonate, or fungicidal agents, such as, for example, sodium o-phenol-phenolate and sodium penta-chlorophenolate. Dyestuff mixtures finished as powders moreover also contain other auxiliaries, such as, for example, wetting agents or dust removal agents.

The dyestuff mixtures according to the invention are outstandingly suitable, as such or as a mixture with other disperse dyestuffs, for dyeing and printing hydrophobic synthetic fibre materials. Surprisingly, they are superior to the individual dyestuffs in respect of dyeing behaviour and coloristic fastnesses, such as, for example, levelling power, thermomigration, fastness to thermofixing and fastness to water, washing and rubbing, and especially in build-up and exhaustion capacity and temperature sensitivity. Moreover, outstandingly deep dyeings with excellent bath exhaustion are still obtained with the dyestuff mixtures according to the invention even when the dyeing temperatures are reduced.

Possible hydrophobic synthetic materials are, for example: secondary cellulose acetate, cellulose triacetate, polyamides and, in particular, high molecular weight polyesters, such as, for example, polyethylene glycol terephthalate, and mixtures thereof with natural fibre materials, such as, for example, cotton, regenerated cellulose fibres or wool.

The dyestuff mixtures according to the invention are preferably used for dyeing and printing materials of high molecular weight polyesters, in particular those based on polyethylene glycol terephthalates, or mixtures thereof with natural fibre materials, or of materials of cellulose triacetate. These materials can be in the form of sheet-like or thread-like structures and can be processed, for example, to yarns or woven or knitted textile materials. The fibre material mentioned is dyed with the dyestuff mixtures according to the invention in a manner which is known per se, preferably from aqueous suspension, if appropriate in the presence of carriers, at between 80° and about 110° C. by the exhaustion process or by the HT process in a dyeing autoclave at 110° at 140° C., and by the so-called thermosol process, in which the goods are padded with the dye liquor and then fixed at about 180° to 230° C. The materials mentioned can be printed by a procedure in which the goods printed with printing pastes containing dyestuff mixtures according to the invention are treated, if appropriate in the presence of a carrier, at temperatures of between 110° and 230° C. with HT steam, pressurized stream or dry heat in order to fix the dyestuff.

The dyestuff mixtures according to the invention can also be used for dyeing the hydrophobic materials described above from organic solvents by the methods known for this, and for bulk-dyeing.

To prepare the dye liquors, the required amounts of the dyestuff mixtures which have been prepared in accordance with the above statements are diluted with the dyeing medium, preferably with water, such that a liquor ratio of 5:1 to 50:1 results for dyeing.

The invention is illustrated in more detail by the following examples:

Example 1

22.5 g of the dyestuff of the formula III

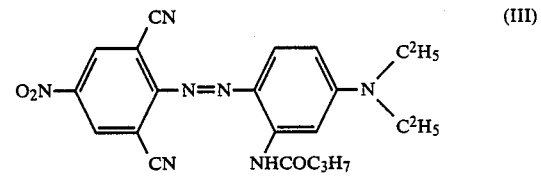

and 7.5 g of the dyestuff of the formula IV

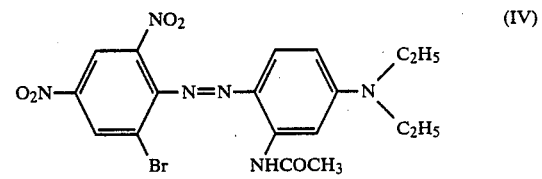

are brought to a pH of 8 in 250 ml of water with 87.2 g of sodium ligninsulphonate and 12.6 g of a non-ionic dispersing agent based on arylpolyglycol ether using 50% strength acetic acid, and the mixture is ground to fine division (80% ≦1 μ) in a sand mill, sieved and sprayed to a spray-drier. 2 g of the dyestuff thus obtained are dispersed in 2,000 g of water. 4 g of ammonium sulphate, 2 g of a commercially available dispersing agent based on a condensation product of sodium naphthalenesulphonate and formaldehyde and 2 g of a condensation product of m-cresol, formaldehyde and sodium sulphite are added to the dispersion and the pH is brought to 5.5 with acetic acid. 100 g of a texturized polyester fabric based on polyethylene glycol terephthalate are introduced into the dye liquor thus obtained and dyeing is carried out at 120° C. for ¾ hour. After subsequent rinsing, reduction cleaning with 0.2% strength sodium dithionite solution at 70 to 80° C. for 15 minutes, rinsing and drying, a deep blue dyeing with outstanding coloristic properties is obtained.

If another 100 g of a texturized polyester fabric based on polyethylene glycol terephthalate is introduced into the dye-bath to perform an exhaust test, dyeing is carried out at 135° C. for 1 hour and the exhaust test material is after-treated as described above the actual dyeing, an almost colourless dyeing is obtained.

Example 2

15.8 g each of the dyestuff of the formula III and the dyestuff of the formula V

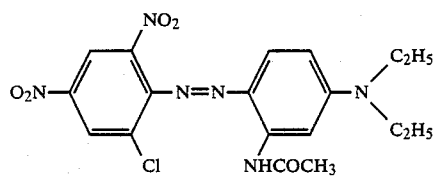

are brought to a pH of 5.9 in 250 ml of water together with 43.6 g of ligninsulphonate and 12.6 g of a non-ionic dispersing agent based on arylpolyglycol ether, using 50% strength acetic acid, and the mixture is homogenized with a toothed stirrer. The resulting dispersion is then heated to 120° C. in an autoclave in the course of 3 hours and stirred at this temperature for 2 hours. After cooling, 43.6 g of a condensation product of cresol, formaldehyde and sodium naphthol-2-sulphonate are added and the dispersion is brought to pH 8.0 with 50% strength acetic acid. The dispersion is then ground for 2 hours at room temperature in the bead mill to a fine division (80%<1 μ), sieved and sprayed in a spray-drier.

If the dyestuff thus prepared is used for dyeing in accordance with the statements in Example 1, the outstanding build-up with exhaustion behaviour of this dyestuff according to the invention is found in the resulting dyeings.

Example 3

10 g each of the dyestuff of the formulae III, IV and VI

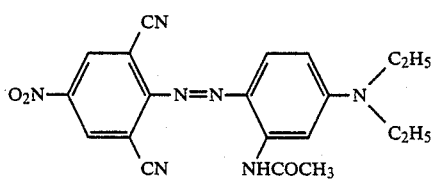

are dissolved in 300 ml of dimethylsulphoxide at 110° C., precipitated on 1.5 l of water, filtered off and dried at 50° C. in vacuo check. 10 g of the dyestuff mixture thus obtained are ground in a sand mill together with 10 g of a condensation product of naphthalene-sulphonic acid and formaldehyde and 80 g of water. If 4.5 g of this finished dyestuff is used for dyeing analogously to the statements in Example 1, deep blue dyeings with outstanding fastness properties are likewise obtained.

The following table shows further dyestuff mixtures according to the invention with the meanings R, $R^1$, $R^2$ and Hal and the weight ratio of the individual dyestuffs of the formulae I and II, which can be prepared in accordance with the above statements and likewise give deep blue dyeings and prints with likewise very good coloristic properties on polyester materials.

| Example | General formula | $R^1$ | $R^2$ | R | Hal | Weight ratio |
|---|---|---|---|---|---|---|
| 4 | I | $C_2H_5$ | $C_2H_5$ | n-$C_3H_7$ | — | 40 |
|   | I | $C_2H_5$ | $C_2H_5$ | $CH_3$ | — | 20 |
|   | II | $C_2H_5$ | $C_2H_5$ | $CH_3$ | Cl | 40 |
| 5 | I | $C_2H_5$ | $C_2H_5$ | $CH_3$ | — | 50 |
|   | II | $C_2H_5$ | $C_2H_5$ | $CH_3$ | Cl | 50 |
| 6 | I | $C_2H_5$ | $C_2H_5$ | $CH_3$ | — | 75 |
|   | II | $C_2H_5$ | $C_2H_5$ | $CH_3$ | Br | 25 |
| 7 | I | $C_2H_5$ | $C_2H_5$ | $CH_3$ | — | 30 |
|   | I | n-$C_3H_7$ | n-$C_3H_7$ | $CH_3$ | — | 30 |
|   | II | $C_2H_5$ | $C_2H_5$ | $CH_3$ | Br | 40 |
| 8 | I | $C_2H_5$ | $C_2H_5$ | $CH_3$ | — | 35 |
|   | I | n-$C_3H_7$ | n-$C_3H_7$ | $CH_3$ | — | 35 |
|   | II | $C_2H_5$ | $C_2H_5$ | $CH_3$ | Cl | 30 |
| 9 | I | n-$C_3H_7$ | n-$C_3H_7$ | $CH_3$ | — | 60 |
|   | II | $C_2H_5$ | $C_2H_5$ | $CH_3$ | Br | 40 |
| 10 | I | n-$C_3H_7$ | n-$C_3H_7$ | $CH_3$ | — | 35 |
|   | II | $C_2H_5$ | $C_2H_5$ | $CH_3$ | Cl | 65 |
| 11 | I | $C_2H_5$ | $C_2H_5$ | n-$C_3H_7$ | — | 40 |
|   | I | n-$C_3H_7$ | n-$C_3H_7$ | $CH_3$ | — | 30 |
|   | II | $C_2H_5$ | $C_2H_5$ | $CH_3$ | Br | 30 |
| 12 | I | $C_2H_5$ | $C_2H_5$ | n-$C_3H_7$ | — | 45 |
|   | I | n-$C_3H_7$ | n-$C_3H_7$ | $CH_3$ | — | 35 |
|   | II | $C_2H_5$ | $C_2H_5$ | $CH_3$ | Cl | 20 |
| 13 | I | $C_2H_5$ | $C_2H_5$ | $CH_3$ | — | 50 |
|   | II | $C_2H_5$ | $C_2H_5$ | $CH_3$ | Br | 25 |
|   | II | $C_2H_5$ | $C_2H_5$ | $CH_3$ | Cl | 25 |
| 14 | I | $C_2H_5$ | $C_2H_5$ | n-$C_3H_7$ | — | 30 |
|   | II | $C_2H_5$ | $C_2H_5$ | $CH_3$ | Br | 35 |
|   | II | $C_2H_5$ | $C_2H_5$ | $CH_3$ | Cl | 35 |
| 15 | I | n-$C_3H_7$ | n-$C_3H_7$ | $CH_3$ | — | 80 |
|   | II | $C_2H_5$ | $C_2H_5$ | $CH_3$ | Br | 10 |
|   | II | $C_2H_5$ | $C_2H_5$ | $CH_3$ | Cl | 10 |
| 16 | I | $C_2H_5$ | $C_2H_5$ | $C_2H_5$ | — | 45 |
|   | II | $C_2H_5$ | $C_2H_5$ | $CH_3$ | Br | 55 |
| 17 | I | $C_2H_5$ | $C_2H_5$ | i-$C_3H_7$ | — | 55 |
|   | II | $C_2H_5$ | $C_2H_5$ | $CH_3$ | Cl | 45 |
| 18 | I | $C_2H_5$ | $C_2H_5$ | n-$C_4H_9$ | — | 10 |
|   | II | $C_2H_5$ | $C_2H_5$ | $C_2H_5$ | Br | 90 |
| 19 | I | $C_2H_5$ | $C_2H_5$ | n-$C_5H_{11}$ | — | 60 |
|   | II | $C_2H_5$ | $C_2H_5$ | $CH_3$ | Cl | 40 |
| 20 | I | $C_2H_5$ | $C_2H_5$ | $CH_3$ | — | 30 |
|   | I | $C_2H_5$ | $C_2H_5$ | $C_2H_5$ | — | 30 |
|   | II | $C_2H_5$ | $C_2H_5$ | $CH_3$ | Br | 40 |
| 21 | I | $C_2H_5$ | $C_2H_5$ | $CH_3$ | — | 33⅓ |
|   | I | $C_2H_5$ | $C_2H_5$ | i-$C_3H_7$ | — | 33⅓ |
|   | II | $C_2H_5$ | $C_2H_5$ | $CH_3$ | Br | 33⅓ |
| 22 | I | $C_2H_5$ | $C_2H_5$ | $C_2H_5$ | — | 40 |
|   | I | $C_2H_5$ | $C_2H_5$ | n-$C_3H_7$ | — | 40 |
|   | II | $C_2H_5$ | $C_2H_5$ | $CH_3$ | Br | 20 |
| 23 | I | $C_2H_5$ | $C_2H_5$ | $C_2H_5$ | — | 20 |
|   | I | $C_2H_5$ | $C_2H_5$ | i-$C_3H_7$ | — | 40 |
|   | II | $C_2H_5$ | $C_2H_5$ | $CH_3$ | Cl | 40 |
| 24 | I | $C_2H_5$ | $C_2H_5$ | i-$C_3H_7$ | — | 10 |
|   | I | $C_2H_5$ | $C_2H_5$ | n-$C_3H_7$ | — | 60 |
|   | II | $C_2H_5$ | $C_2H_5$ | $CH_3$ | Br | 30 |
| 25 | I | $CH_3$ | $CH_3$ | n-$C_3H_7$ | — | 75 |
|   | II | $C_2H_5$ | $C_2H_5$ | $CH_3$ | Cl | 25 |
| 26 | I | n-$C_4H_9$ | n-$C_4H_9$ | $CH_3$ | — | 25 |
|   | II | $C_2H_5$ | $C_2H_5$ | $CH_3$ | Br | 75 |
| 27 | I | n-$C_5H_9$ | n-$C_5H_9$ | $CH_3$ | — | 80 |
|   | II | $C_2H_5$ | $C_2H_5$ | $CH_3$ | Cl | 20 |
| 28 | I | n-$C_3H_7$ | n-$C_3H_7$ | $C_2H_5$ | — | 60 |
|   | II | $C_2H_5$ | $C_2H_5$ | $CH_3$ | Br | 40 |
| 29 | I | $C_2H_5$ | $C_2H_5$ | $C_2H_5$ | — | 15 |
|   | I | n-$C_3H_7$ | n-$C_3H_7$ | $CH_3$ | — | 15 |
|   | II | $C_2H_5$ | $C_2H_5$ | $CH_3$ | Br | 70 |
| 30 | I | n-$C_4H_9$ | n-$C_4H_9$ | $CH_3$ | — | 5 |
|   | I | n-$C_3H_7$ | n-$C_3H_7$ | n-$C_3H_7$ | — | 30 |
|   | II | $C_2H_5$ | $C_2H_5$ | $CH_3$ | Cl | 65 |
| 31 | I | $C_2H_5$ | $C_2H_5$ | $CH_3$ | — | 25 |
|   | I | $C_2H_5$ | $C_2H_5$ | n-$C_3H_7$ | — | 25 |
|   | I | $C_3H_7$ | $C_3H_7$ | $CH_3$ | — | 25 |
|   | II | $C_2H_5$ | $C_2H_5$ | $CH_3$ | Br | 25 |
| 32 | I | $C_2H_5$ | $C_2H_5$ | $CH_3$ | — | 34 |
|   | I | $C_2H_5$ | $C_2H_5$ | n-$C_3H_7$ | — | 50 |
|   | II | $C_2H_5$ | $C_2H_5$ | $CH_3$ | Cl | 8 |
|   | II | $C_2H_5$ | $C_2H_5$ | $CH_3$ | Br | 8 |
| 33 | I | $C_2H_5$ | $C_2H_5$ | $CH_3$ | — | 50 |
|   | II | $C_2H_5$ | $C_2H_5$ | n-$C_3H_7$ | Br | 50 |
| 34 | I | $C_2H_5$ | $C_2H_5$ | $CH_3$ | — | 35 |

-continued

| Example | General formula | $R^1$ | $R^2$ | R | Hal | Weight ratio |
|---|---|---|---|---|---|---|
|  | II | $C_2H_5$ | $C_2H_5$ | $C_2H_5$ | Cl | 65 |
| 35 | I | $C_2H_5$ | $C_2H_5$ | $CH_3$ | — | 65 |
|  | II | $C_2H_5$ | $C_2H_5$ | $n\text{-}C_3H_7$ | Cl | 35 |
| 36 | I | $C_2H_5$ | $C_2H_5$ | $CH_3$ | — | 80 |
|  | II | $n\text{-}C_3H_7$ | $n\text{-}C_3H_7$ | $CH_3$ | Br | 20 |
| 37 | I | $C_2H_5$ | $C_2H_5$ | $n\text{-}C_3H_7$ | — | 60 |
|  | II | $n\text{-}C_3H_7$ | $n\text{-}C_3H_7$ | $CH_3$ | Cl | 40 |
| 38 | I | $n\text{-}C_3H_7$ | $n\text{-}C_3H_7$ | $CH_3$ | — | 40 |
|  | II | $C_2H_5$ | $C_2H_5$ | $n\text{-}C_3H_7$ | Br | 60 |
| 39 | I | $C_2H_5$ | $C_2H_5$ | $n\text{-}C_3H_7$ | — | 93 |
|  | II | $n\text{-}C_4H_9$ | $n\text{-}C_4H_9$ | $CH_3$ | Cl | 7 |
| 40 | I | $C_2H_5$ | $C_2H_5$ | $C_2H_5$ | — | 55 |
|  | II | $n\text{-}C_6H_{13}$ | $n\text{-}C_6H_{13}$ | $CH_3$ | Br | 45 |
| 41 | I | $C_2H_5$ | $C_2H_5$ | $CH_3$ | — | 65 |
|  | II | $CH_3$ | $CH_3$ | $i\text{-}C_3H_7$ | Cl | 35 |
| 42 | I | $C_2H_5$ | $C_2H_5$ | $n\text{-}C_3H_7$ | — | 20 |
|  | I | $C_2H_5$ | $C_2H_5$ | $i\text{-}C_3H_7$ | — | 20 |
|  | II | $n\text{-}C_3H_7$ | $n\text{-}C_3H_7$ | $CH_3$ | Br | 60 |
| 43 | I | $C_2H_5$ | $n\text{-}C_3H_7$ | $CH_3$ | — | 50 |
|  | II | $C_2H_5$ | $C_2H_5$ | $CH_3$ | Cl | 50 |
| 44 | I | $C_2H_5$ | $i\text{-}C_3H_7$ | $C_2H_5$ | — | 65 |
|  | II | $C_2H_5$ | $C_2H_5$ | $CH_3$ | Br | 35 |
| 45 | I | $C_2H_5$ | $n\text{-}C_4H_9$ | $CH_3$ | — | 80 |
|  | II | $C_2H_5$ | $n\text{-}C_4H_9$ | $C_2H_5$ | Br | 20 |
| 46 | I | $C_2H_5$ | $C_2H_5$ | $C_2H_5$ | — | 50 |
|  | II | $CH_3$ | $n\text{-}C_4H_9$ | $CH_3$ | Cl | 50 |
| 47 | I | $CH_3$ | $i\text{-}C_4H_9$ | $CH_3$ | — | 20 |
|  | II | $C_2H_5$ | $C_2H_5$ | $i\text{-}C_3H_7$ | Cl | 80 |

What is claimed is:

1. A mixture of monoazo dyestuffs which contains one or more dyestuffs of the formula I

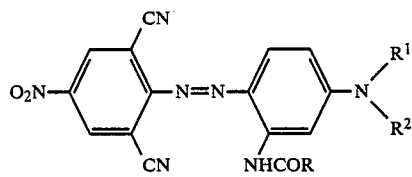 (I)

and one or more dyestuffs of the formula II

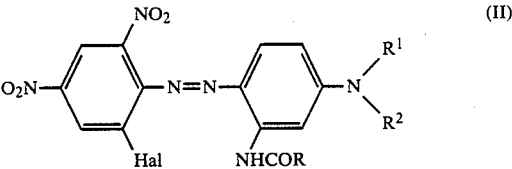 (II)

wherein $R^1$ and $R^2$ independently of one another each denote linear or branched alkyl with 1 to 6 carbon atoms, R denotes linear or branched alkyl with 1 to 5 carbon atoms and Hal denotes chloro or bromo.

2. Dyestuff mixture according to claim 1 wherein the weight content of a dyestuff of either the formula I or II is 1 to 99%.

3. Dyestuff mixture according to claim 1 wherein the weight content of a dyestuff of either the formula I or II is 5 to 95%.

4. Dyestuff mixture according to claim 1 wherein the weight content of a dyestuff of either the formula I or II is 25 to 75%.

5. Dyestuff mixture according to claim 1 wherein $R^1$ and $R^2$ denote linear alkyl with 2 to 4 carbon atoms and R denotes linear or branched alkyl with 1 to 3 carbon atoms.

6. Dyestuff mixture according to claim 1 wherein $R^1$ and $R^2$ in the individual components of the formulae I and II are in each case identical and denote ethyl or n-propyl.

7. Dyestuff mixture according to claim 1 wherein at least one individual component of the formula I which has the same radical for each of $R^1$ and $R^2$ and at least one individual component of the formula II which has the same radical for each of $R^1$ and $R^2$ but different from that of formula I.

8. Dyestuff mixture according to claim 1 at least one individual component of the formula I and at least one individual component of the formula II differ in the radical R.

9. Process for the preparation of the dyestuff mixtures according to claim 1 wherein a mixture of individual dyestuffs of the formulae I and II is recrystallized or dissolved and precipitated or heated in water at temperatures of 50° to 150° C. in the presence of one or more dispersing agents or an organic solvent, and converted into a dyestuff formulation.

10. In the process for dyeing and printing hydrophobic fiber materials and mixtures thereof with natural fiber materials with an azo dyestuff composition, the improvement comprises said dyestuff composition being a dyestuff mixture according to claim 1.

* * * * *